INVENTOR.
RAYMOND WALLACE
BY Elliott & Pastoriza
ATTORNEYS

United States Patent Office 3,345,086
Patented Oct. 3, 1967

3,345,086
QUICK DISCONNECT COUPLING FOR WELDING TORCH
Raymond Wallace, Scotia, N.Y., assignor to WDL Incorporated, Los Angeles, Calif.
Original application June 1, 1965, Ser. No. 465,821. Divided and this application Oct. 18, 1965, Ser. No. 496,780
4 Claims. (Cl. 285—38)

ABSTRACT OF THE DISCLOSURE

This disclosure relates to a quick disconnect coupling for enabling interchanging of welding heads with a handle used for holding the head. The coupling itself comprises a connector having three longitudinal bores opening out on opposite faces for receiving connecting tubes from the handle and welding head respectively. The handle itself includes internal threads for engaging external threads on the connector in such a manner that the tubes received within opposite ends of the bores in the connector are held in position when the handle is threaded on the head and are free to be removed from the connector when the handle is unthreaded. A sealing gasket is provided for assuring against leakage when the handle is threaded onto the head.

---

This application is a division of my co-pending patent application, Ser. No. 465,821, filed June 1, 1965, and entitled "Welding Torch," now abandoned.

Among the many unique features disclosed in my above-identified application is the provision of a quick disconnect coupling means for attaching a head of a welding torch to a handle within which are disposed tubular members for conducting gas, coolant, and electrical current to the welding torch.

Many welding torches presently available are provided with a handle means which is integrally connected with the torch head so as to be incapable of being disconnected therefrom. By this type of arrangement, it is impossible for the operator to select and use a variety of torch heads in conjunction with one handle and its associated tubes, which may be desirable in order to conduct a variety of welding operations. For example, it has been found that the torch head, when connected to the handle at a particular angle, may be awkward and difficult to use when the work area is restricted in size. In such situations, it is difficult for the operator to position the torch head at a proper angle with respect to the surface being welded.

In order to solve the above-mentioned problem, with presently available welding torches, the operator must select a different torch having the desired angular relationship and this involves the necessity of disconnecting the tubes from the sources of the materials and electrical energy which they conduct to the torch. The operator must then connect the tubes associated with the proper torch to the sources of the materials and energy required for the welding operation. These steps of disconnecting and connecting the tubes are time consuming and result in higher costs.

With the foregoing in mind, it is accordingly a primary object of this invention to provide a novel quick disconnect coupling means for a welding torch which enables interchangeability of welding torch heads of different angular configurations to the end that welding operations may be efficiently conducted under a wide variety of working conditions.

Another object is to provide a novel coupling means of simplified construction enabling the operator to select and use a wide variety of torch heads in conjunction with a single torch handle and its associated set of tubes.

Briefly, these and many other objects and advantages of this invention are attained by providing a novel welding torch coupling means including a threaded terminal connector secured within an extension of a welding torch head. The threaded connector is preferably provided with a plurality of openings therethrough adapted to receive end portions of a plurality of tubular members disposed within the extension of the torch. The coupling means further includes a threaded coupling sleeve secured within a handle for the torch. The handle contains a plurality of tubular members for conducting coolant, gas, and electrical current to the above-mentioned tubular members, and thence to the welding torch head.

A flanged terminal connector is positioned within the handle in engagement with a flanged portion of the coupling sleeve. The flanged terminal connector includes a plurality of openings adapted to receive the tubular members positioned within the handle.

A resilient gasket is similarly provided with a plurality of openings and is adapted to be positioned between the flanged and threaded terminal connectors when the coupling means is engaged or connected.

By the foregoing arrangement, the handle may be quickly and easily disengaged from a welding torch head and another head substituted therefor by simply rotating the handle with respect to the torch head.

A better understanding of the invention will now be had by referring to a preferred embodiment thereof as illustrated in the accompanying drawings, in which.

Figure 1:
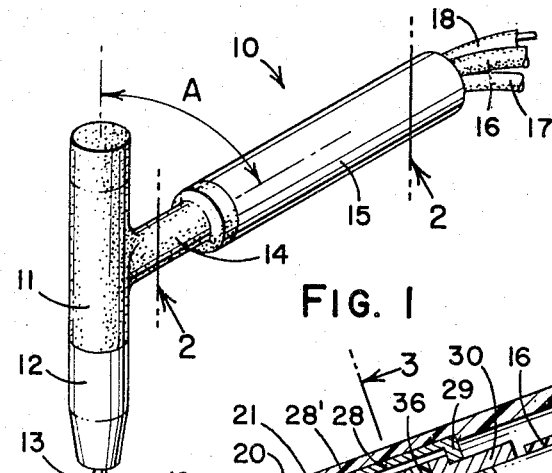
FIGURE 1 is a perspective view of a welding torch incorporating the novel coupling means in accordance with this invention.

Referring first to FIGURE 1, there is shown a welding torch 10 which, as described in my above-mentioned co-pending application, includes a head portion 11 terminating at its lower end in a ceramic nozzle 12 within which is positioned an electrode 13. Extending outwardly from the head portion 11 at an angle A is an extension portion 14 to which is removably connected a handle 15. Positioned within the handle 15 and extending outwardly therefrom are a series of flexible tubes 16, 17, and 18, which conduct gas, coolant, and electrical current to the welding torch in the manner described in my co-pending application.

Figure 2:
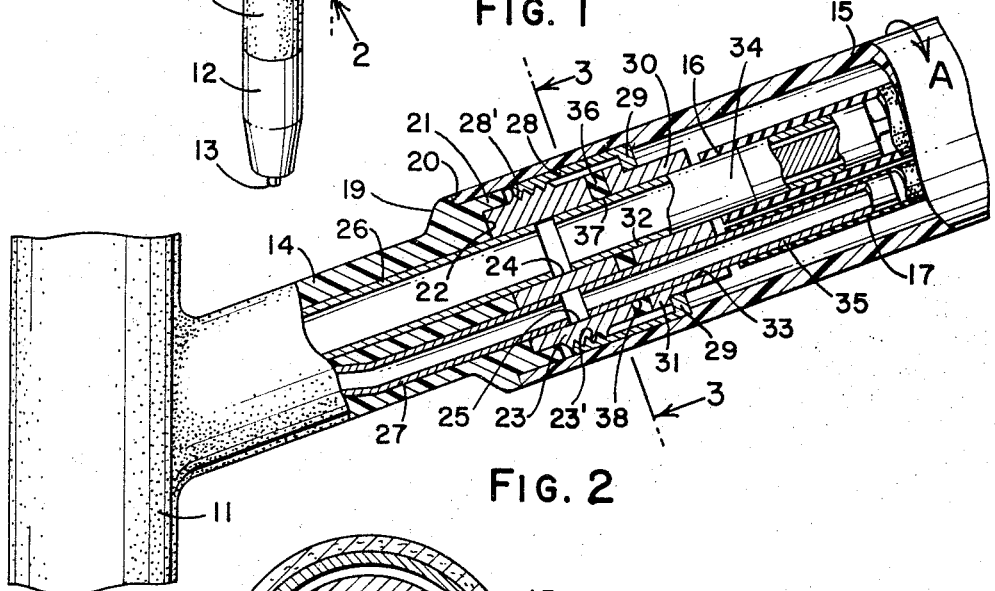
FIGURE 2 is a fragmentary side elevational view partly in cross-section taken in the direction of arrows 2—2 of FIGURE 1.

Referring now to FIGURE 2, it will be seen that the extension 14 is provided with an enlarged diameter portion 19 near an end thereof. As shown, a shoulder 20 is cut into the outer surface of the enlarged portion 19. The end of the extension 14 is further provided with a circular undercut flange 21 extending over a second shoulder 22.

A threaded terminal connector 23 is secured to the end of the extension 14 by means of an end thereof positioned within the undercut portion of the flange 21 in abutting engagement with the shoulder 22. The terminal connector is provided with a threaded portion 23' on its outer periphery as shown. Defined within the terminal connector 23 is a plurality of longitudinal openings, two of which are shown at 24 and 25, respectively. These openings receive end portions of tubes 26 and 27 which are positioned within the extension 14 and function as described in my co-pending patent application.

Shown secured within the interior surface of the handle 15 near an end thereof is a generally tubular coupling sleeve 28 including an internally threaded portion 28' adjacent one of its ends and an inturned flange 29 forming the other end thereof. The wall of the sleeve 28 is generally L-shaped in cross-section and is press-fitted into the interior wall of the handle 15 so as to be rotatable therewith.

A flanged terminal connector 30 is positioned within the handle 15 and includes an out-turned flange 31 which is positioned in abutting engagement with the flange 29 of the coupling sleeve 28. The terminal connector 30 is provided with a plurality of longitudinal openings, two of which are shown at 32 and 33, respectively. These openings receive tubes 34 and 35 which are connected to the flexible tubes 16 and 17, respectively, so as to define conduits for the purposes described in my co-pending application.

As shown, a resilient gasket 36 is positioned between the ends of the terminal connectors 23 and 28, respectively, to thus provide a seal for preventing leakage of gas and coolant through the coupling. The gasket 36 is provided with a plurality of longitudinal openings, two of which are shown at 37 and 38 to receive the tubes 34 and 35, respectively.

Figure 3:
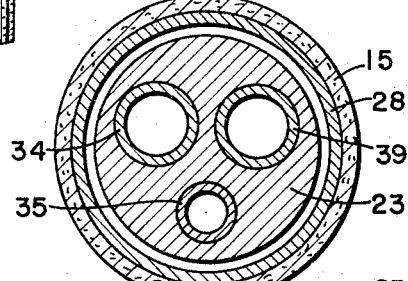
FIGURE 3 is a cross-section view taken in the direction of arrows 3—3 of FIGURE 2.

Referring now to FIGURE 3, it will be seen that in addition to the tubes 34 and 35 above described, the terminal connector 23 is adapted to receive therethrough an additional tube 39.

Figure 4:
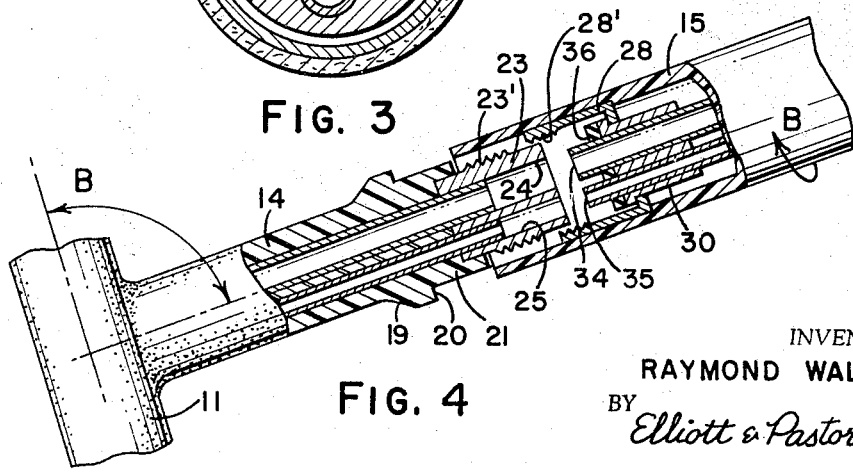
FIGURE 4 is a fragmentary side elevational view, partly in cross-section, of the coupling means in a disconnected position.

In operation and with reference first to FIGURE 2, the handle 15 is rotated with respect to the extension 14 in the direction of arrow A causing the coupling sleeve 28, which is secured to the handle, to rotate with respect to the terminal connectors 23 and 30 with the threaded connection between the terminal connector 23 and sleeve 28 being disconnected as the rotation proceeds. After the threaded portions have become disengaged, the extension 14 is simply pulled away from the handle 15 as shown in FIGURE 4, causing the tubes 34 and 35 to be withdrawn from the respective openings 24 and 25 defined within the connector 23.

As heretofore discussed, the operator may require the use of a welding torch having the head portion 11 secured to the extension 14 at an angle B different from the angle A as previously described with reference to FIGURE 1. Upon selecting a welding torch having the desired angle and with reference now to FIGURE 4, the operator may attach it to the handle by simply reversing the above described operation; that is, the extension 14 and connector 23 are moved within the handle 15 so that the tubes 34 and 35 are received within the openings 24 and 25, respectively. This inward movement is continued until the threaded portions 23' and 28' of the connector 23 and sleeve 28 engage each other, at which time the threaded portions are completely engaged by rotating the handle and sleeve with respect to the connectors 23 and 30 in the direction of arrow B. This rotation draws the extension 14 within the handle until the end of the handle abuts against the shoulder 20 and the gasket 36 is compressed between the connectors 23 and 30 as shown in FIGURE 2.

From the foregoing description, it is apparent that this invention provides a novel coupling means for a welding torch whereby a variety of torch heads may be used in conjunction with a single handle and its associated tubular members.

Various changes falling within the scope and spirit of this invention will occur to those skilled in the art. The coupling means is therefore not to be thought of as limited to the specific embodiment set forth.

What is claimed is:

1. A quick disconnect coupling for connecting an extension of a welding torch to a handle, comprising: a first threaded means secured within said extension in longitudinal alignment therewith; a second threaded means press-fit into engagement with interior portions of said handle and being adapted to be threadedly engaged with said first threaded means, said second threaded means having an inturned flange forming an end thereof; a terminal connector positioned within said second threaded means and having an out-turned flange forming an end thereof in engagement with said inturned flange; and a resilient gasket means positioned between said first threaded means and said end of said terminal connector and being compressed therebetween when said first and second threaded means are in engagement, and adapted to be moved out of engagement with said first threaded means when said handle is rotated to cause said first and second threaded means to be disengaged.

2. The subject matter of claim 1, in which said first threaded means includes a threaded portion on its outer periphery, and in which said second threaded means includes a threaded portion on its interior surface near an end opposite to said inturned flange, whereby said threaded portions are engageable and disengageable by means of rotating said handle with respect to said first threaded means.

3. The subject matter of claim 1, in which said first threaded means, gasket means, and terminal connector are each provided with a plurality of longitudinal openings therethrough arranged in longitudinal alignment adapted to receive a plurality of tubular extensions therein.

4. A quick disconnect coupling for connecting an extension of a welding torch to a handle, comprising: an externally threaded terminal connector mounted within an end of said extension and having a plurality of longitudinal openings defined therethrough adapted to receive a first plurality of tubular members therein; a flanged terminal connector disposed within said handle and having a plurality of longitudinal openings defined therethrough adapted to receive a second plurality of tubular members therein co-extensively with said first plurality of tubular members, said flanged terminal connector further having an out-turned flange forming an end thereof; a resilient gasket positioned adjacent to said end of said flanged terminal connector and having a plurality of longitudinal openings defined therethrough adapted to receive said second plurality of tubular members therein; and a tubular coupling sleeve having its outer periphery press-fit into engagement with an interior portion of said handle, said coupling sleeve including an internally threaded portion disposed adjacent an end thereof and an inturned flange forming the other end thereof, said coupling sleeve being positioned to surround said flanged terminal connector to position said inturned flange in engagement with said out-turned flange, whereby when said second plurality of tubular members are positioned within said openings in said threaded terminal connector, said handle may be rotated to cause said externally threaded and internally threaded portions to engage to thereby move said flanged terminal connector and said gasket toward said threaded terminal connector so that said gasket means engages said threaded connector.

References Cited
UNITED STATES PATENTS

| | | | |
|---|---|---|---|
| 626,447 | 6/1889 | Strater | 285—354 X |
| 1,050,038 | 1/1913 | O'Malley | 285—354 X |
| 1,592,012 | 7/1926 | Stafford | 339—15 |
| 2,476,777 | 7/1949 | Smith | 285—137 X |
| 2,832,881 | 4/1958 | Andriola | 219—75 |
| 3,250,889 | 5/1966 | Himmelman | 219—75 |

CARL W. TOMLIN, *Primary Examiner.*

R. G. BERKLEY, *Assistant Examiner.*